United States Patent
Kapoor

(10) Patent No.: US 9,934,118 B2
(45) Date of Patent: Apr. 3, 2018

(54) REDUCING SPQL TESTER TIME FOR THE CRITICAL PATHS STRESS TEST

(71) Applicant: International Business Machines Corporation, Armonk, NY (US)

(72) Inventor: Shakti Kapoor, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 71 days.

(21) Appl. No.: 15/004,184

(22) Filed: Jan. 22, 2016

(65) Prior Publication Data

US 2017/0212818 A1    Jul. 27, 2017

(51) Int. Cl.
- *G06F 11/00* (2006.01)
- *G06F 11/263* (2006.01)
- *G06F 11/22* (2006.01)

(52) U.S. Cl.
CPC ........ *G06F 11/263* (2013.01); *G06F 11/2236* (2013.01)

(58) Field of Classification Search
CPC .... G06F 11/263; G06F 11/2236; G06F 11/26; G06F 11/3024
USPC .............................................. 714/27, 25, 30
See application file for complete search history.

(56) References Cited

U.S. PATENT DOCUMENTS

| | | | |
|---|---|---|---|
| 2012/0023315 A1* | 1/2012 | Colletti | G06F 9/30094 712/227 |
| 2012/0166774 A1* | 6/2012 | Tsuji | G06F 11/2236 712/227 |
| 2014/0149800 A1* | 5/2014 | Nishimaki | G06F 11/2273 714/40 |

OTHER PUBLICATIONS

Xiong et al., "Optimal Test Margin Computation for At-Speed Structural Test," IEEE Transactions on Computer-Aided Design of Integrated Circuits and Systems, 2009, pp. 1-10.

* cited by examiner

*Primary Examiner* — Joseph D Manoskey
(74) *Attorney, Agent, or Firm* — Patterson + Sheridan, LLP

(57) ABSTRACT

Embodiments disclose techniques for executing a test case to test a processor by bypassing an instruction pipeline of the processor. In one embodiment, the processor receives a plurality of test cases to execute on the processor. Each test case includes one or more instructions. Once received, the processor loads a plurality of registers with one or more first register values for the test case by bypassing the instruction pipeline. Once loaded, the processor runs the test case using the one or more first register values. The processor then retrieves, from the plurality of registers, one or more second register values associated with results of the test case run, by bypassing the instruction pipeline.

17 Claims, 5 Drawing Sheets

REDUCING SPQL TESTER TIME FOR THE CRITICAL PATHS STRESS TEST

BACKGROUND

The present disclosure generally relates to using test patterns to verify and validate a processor, and more specifically, to techniques for reducing the testing time associated with executing a test pattern on a processor for verification and validation.

The shippable product quality level (SPQL) (also referred to as shipped product quality loss) associated with a given shipment of manufactured chips to a customer plays an important role in high volume chip production. The SPQL for a shipment of manufactured chips, in general, refers to the ratio of failing (or deficient) chips to all chips shipped to a customer. For example, a one percent SPQL generally means that for every one hundred chips that are shipped to a customer, only one of the chips is deficient (or doesn't meet the customer's performance requirements). Having a high SPQL for a shipment of chips is generally undesirable. Further, failing to meet a targeted SPQL for a shipment of chips can lead to financial loss for the chip manufacturer. As such, chip manufacturers are increasingly concerned with reducing the SPQL and/or accurately determining the SPQL for manufactured chips before they are shipped to a customer.

To reduce and/or determine the SPQL, chip manufacturers typically employ processor testing tools to screen for defective chips that are produced from the manufacturing process. These testing tools typically use a wide variety of test patterns to verify and validate a system design for a processor. The goal of such tools is typically to generate the most stressful test pattern for a processor to ensure that the processor will meet the customer's performance requirements. In theory, the generated test pattern should provide maximum test coverage and should be interesting enough to stress various timing scenarios on the processor. As such, typically a large amount of test cases are usually generated in order to sufficiently test a processor.

Verifying and validating a processor using test pattern(s) generally includes three stages: (1) a test pattern generation stage; (2) a test pattern loading stage; and (3) a test pattern execution stage. During the execution stage, the processor typically processes the instructions (in a test case) in stages (often referred to as the processor pipeline). For example, the processor typically has to undergo a fetch stage, decode stage, and a dispatch stage before the instruction is executed. Going through all of these stages, however, generally increases the amount of time associated with testing a large number of test cases for a processor. Thus, it may be desirable to reduce the time associated with executing test cases for verifying and validating a processor.

SUMMARY

One embodiment presented herein describes a method for executing a test case to test a processor. The method generally includes receiving a plurality of test cases to execute on the processor. Each test case includes one or more instructions. The method also includes loading a plurality of registers with one or more first register values for the test case by bypassing an instruction pipeline of the processor. The method further includes running the test case using the one or more first register values. The method further yet includes retrieving, from the plurality of registers, one or more second register values associated with results of the test case run, by bypassing the instruction pipeline.

Other embodiments include, without limitation, a computer program product that includes a non-transitory storage medium having computer-readable program code that enables a processing unit to implement one or more aspects of the disclosed methods as well as a system having a processor, memory, and application programs configured to implement one or more of the disclosed methods.

DETAILED DESCRIPTION

Embodiments presented herein disclose techniques for enabling a processor to bypass the pipeline associated with executing instructions for a test pattern used for processor verification and validation.

In a typical first stage of the pipeline, referred to as an "instruction fetch" stage, an instruction from the test pattern is fetched from memory. Then, in a "decode" stage, the instruction is decoded into different control bits, which in general designate i) a type of functional unit (e.g., execution unit, such as a load store unit (LSU)) for performing the operation specified by the instruction, ii) source operands for the operation and iii) destinations for results of operation. Next, in a "dispatch" stage, the decoded instruction is dispatched to an issue queue, where instructions wait for data and an available execution unit. Next, in the "issue" stage, an instruction in the issue queue is issued to a unit having an execution stage. This stage processes the operation as specified by the instruction. Executing an operation specified by an instruction includes accepting one or more operands and producing one or more results.

Processor verification and validation typically involves implementing critical test patterns for certain problematic areas in a chip. Most of the critical test patterns are the same from processor to processor. These tests are the same because the critical paths are generally in the same area of the chip and arrays. For example, registers such as vector registers (VSRs), general purpose registers (GPRs) and the like, generally tend to be in the critical path (that is focused on for testing) of processors. A typical test generally involves these registers saving and restoring in a contiguous area. As described in more detail below, as opposed to going through the (fetch, decode, and dispatch) stages of the processor pipeline in order to execute the instructions for each register, the techniques presented herein allow the LSU to do the save and restore of register operations. As such, the techniques presented herein can substantially reduce (or eliminate) the load time associated with the test program executing instructions via the normal processor pipeline. Further, by allowing the LSU to directly perform the (save, restore, etc.) register operations, the test program can become smaller, allowing more tests to be loaded in one time.

Note that to clearly point out novel features of the present invention, the following discussion omits or only briefly describes conventional features of information processing systems which are apparent to those skilled in the art. It is assumed that those skilled in the art are familiar with the general architecture of processors, and in particular with processors which have multiple elements that operate in parallel to process multiple instructions in a single processing cycle (e.g., as with pipelined stages).

Figure 1:
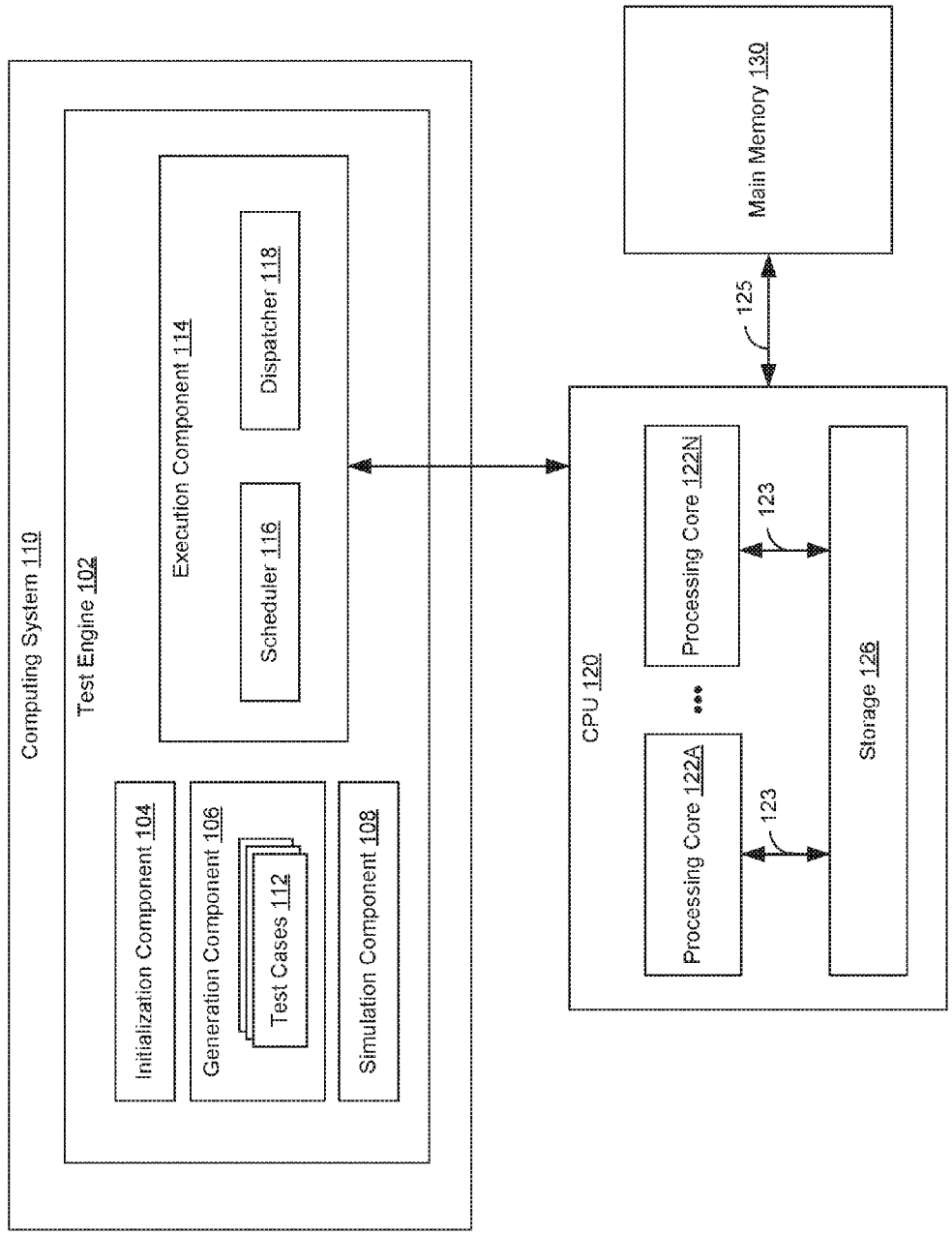
FIG. 1 illustrates an example system for processor design verification and validation, according to one embodiment.

FIG. 1 illustrates an example system 100 for processor design verification and validation, according to one embodiment. As shown, the system 100 includes computing system 110 coupled to central processing unit (CPU) 120, such as a PowerPC microprocessor ("PowerPC" is a trademark of IBM Corporation). In general, the computing system 110 can be any kind of physical computing system, such as a desktop computer, laptop computer, mobile device, tablet computer, and the like. The computing system 110 includes test engine 102, which is configured to test CPU 120 (e.g., for processor design verification and validation). Test engine 102 includes initialization component 104, generation component 106, simulation component 108 and execution component 114.

CPU 120 includes one or more processing cores (or processors) 122A-122N. Each processing core 122 includes various registers, buffers, memories, and other units formed by integrated circuitry, and operates according to reduced instruction set computing ("RISC") techniques. The processing core 122 processes according to processor cycles, synchronized, in some aspects, to an internal clock (not shown). Each processing core 122 may also include local memory (not shown), e.g., such as cache memory, etc., integrated within the processing core 122. Such cache memory can include L1 cache, L2 cache, or other levels of the cache hierarchy. CPU 120 also includes storage 126, which is shared by processing cores 122 via bus (or interconnect) 123. In one embodiment, storage 126 is L2 cache. In another embodiment, storage 126 is L3 cache. In general, however, storage 126 can represent any type storage (e.g., including cache memories, non-volatile or backup memories, and the like).

CPU 120 is also coupled to main memory 130, via bus 125. Main memory 130 may represent random access memory (RAM) devices that include the main storage for a computing system (not shown) that includes CPU 120, as well as supplemental levels of memory, e.g., cache memories, non-volatile or backup memories (e.g., programmable or flash memories), read-only memories, and the like. In one embodiment, main memory 130 may include memory storage physically located in a computing system or another computing device coupled to a computing system that includes CPU 120. The processing cores 122A-N may access local storage (not shown), storage 126, and/or main memory 130 to execute instructions associated with test pattern(s) from test engine 102.

The initialization component 104 is generally configured to receive initialization information (e.g., from a user, database, etc.) for generating test patterns. Such initialization information can include the particular design for test (DFT) technique to apply for testing the CPU 120, architectural details of the CPU 120 (e.g., within one or more architectural verification patterns (AVPs)), critical path information, system timing information, instruction types to execute, memory range, the number of instructions to build in a test pattern, etc. Once the initialization component 104 receives such information, the initialization component 104 provides the information to the generation component 106.

The generation component 106 is generally configured to generate test pattern(s) based on the initialization information provided by the initialization component 104. Each test pattern can include one or more test cases 112. Each test case 112 may include one or more instructions to be executed on the CPU 120. The generation component 106 is configured to generate test patterns to stress critical and/or problematic areas of the CPU 120. For example, the generation component 106 can generate test patterns that include one or more load and/or store instructions for registers in the critical paths of the CPU 120. Once the generation component 106 generates the test patterns, the generation component 106 provides the test pattern(s) to the simulation component 108 and the execution component 114.

The execution component 114 includes scheduler 116 and dispatcher 118. The execution component 114 uses the scheduler 116 to schedule the test pattern(s) to dispatcher 118, which dispatches the scheduled test pattern(s) to processing cores 122A-122N within CPU 120. The processing cores 122A-122N execute the test pattern(s) and provide the results to execution component 114. The execution component 114 compares the results with the simulation results generated by the simulation component 108. The results of the comparison can be provided to a user, stored in a database, etc.

Note FIG. 1 illustrates merely one example of a system 100 that can be used to generate test patterns to verify and validate a processor. Those of ordinary skill in the art will recognize, however, that other configurations of the system 100 (including test engine 102 and CPU 120) can also use the techniques presented herein. For example, although one CPU 120 is shown, the techniques presented herein can be used for any number of CPUs 120. Further, in some embodiments, the test engine 102 and CPU 120 can be within the same computing system.

Figure 2:
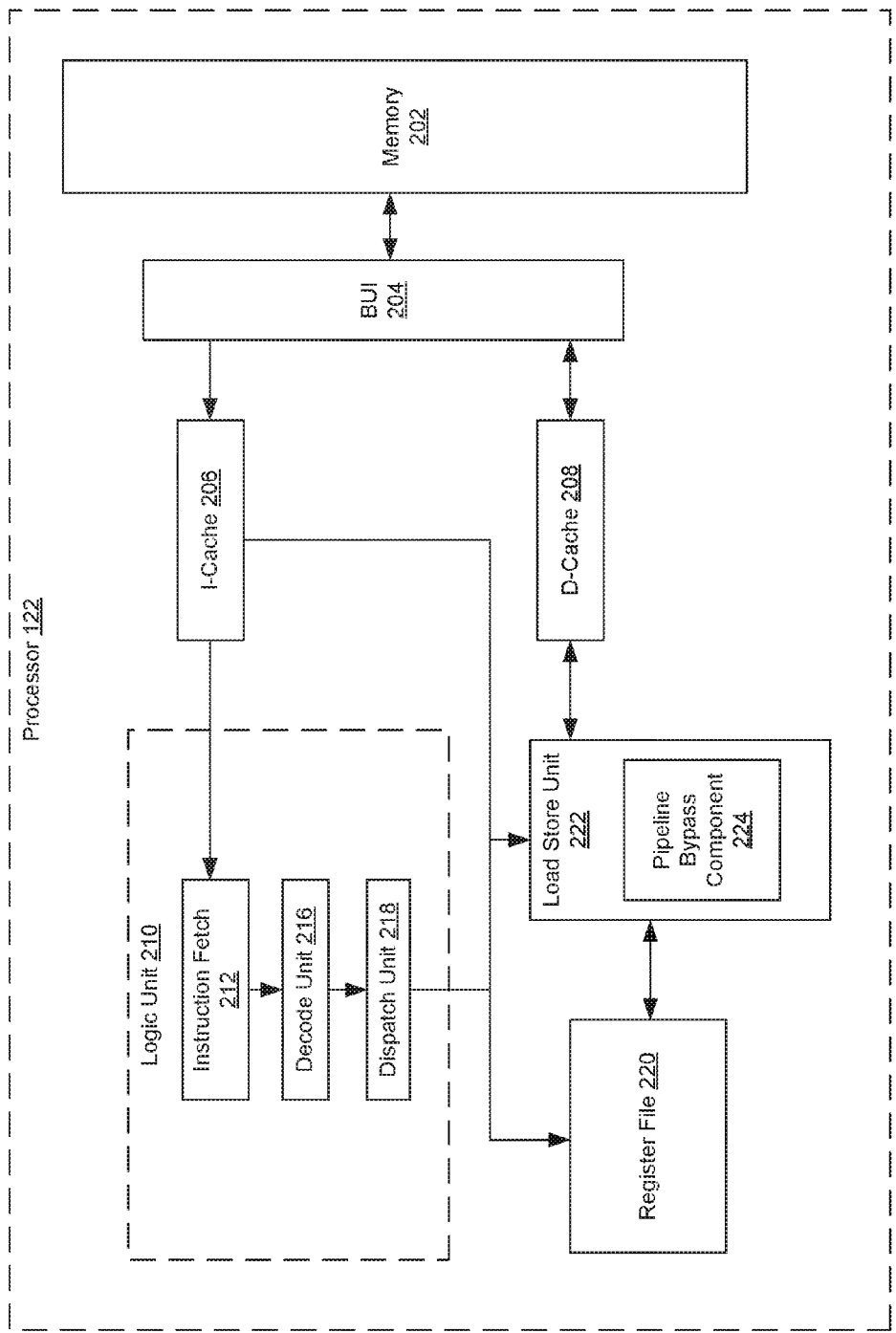
FIG. 2 illustrates an example of a processor configured with a processor pipeline bypass component, according to one embodiment.

FIG. 2 further illustrates an example of a processing core (or processor) 122, described relative to FIG. 1, according to one embodiment. FIG. 2 illustrates merely one example of a processor in which certain aspects of the present disclosure may be practiced. As shown, the processor 122 includes a bus interface unit (BIU) 202 coupled to the bus 123 and/or bus 125 for controlling transfers of data and instructions between memory, such as memory 202, and caches, e.g., instruction cache (I-Cache) 206 and data cache (D-Cache) 208. Memory 202 may be an example of L1 cache, L2 cache, L3 cache, etc. Instructions may be processed in the processor 122 in a sequence of logical, pipelined stages. However, it should be understood that the functions of these stages disclosed herein are merely one reference example of a sequence of stages that the processor 122 may perform to process instructions. For example, some of the pipelined stages may be merged together, extended, removed, etc.

Logic unit 210 includes instruction fetch unit 212, decode unit 216 and dispatch unit 218. The logic unit fetches, via the instruction fetch unit 212, instructions (for a test case) from instruction cache 206 into the instruction buffer, e.g., based on a normal sequence of the instructions, predicted sequence of the instructions, etc. Once fetched, the logic unit 210 decodes the instructions via the decoding unit 216 and dispatches the instructions, via the dispatch unit 218, to the load store unit 222. In executing the instructions, the load store unit 222 inputs and outputs information to registers (shown collectively as register file 220). The load store unit 222 may also access data in data cache 208 when performing register operations. The load store unit 222 may signal a completion unit (not shown) upon execution of the instructions. After executing the instruction, the load store unit 222 may write the results of the instruction back to the register file 220 and/or memory 202. The registers in register file 220 can include general purpose registers, special purpose registers, vector registers, etc.

As mentioned above, in traditional techniques for processor verification and validation, loading and executing a test pattern is generally a very time consuming process. For example, the testing process may include an initialization stage, a pattern loading stage, execution stage and a status readout stage. During pattern loading, the test engine 102 loads the test cases into the local storage (e.g., L1 cache, L2 cache, etc.) used by the processor 122. Using a L2 cache with 2048 lines as a reference example, it may take the test engine 102 approximately 0.15 ms to load each line of cache. The execution stage may include a re-initialization process (e.g., before each test case is run) and the actual executing, by the processor, of each test case. If the test engine 102 generates and dispatches a hundred test cases, the re-initialization process may take 6 ms per test case (e.g., for a total of 600 ms for a hundred test cases). Further, each test case may run for 0.1 ms (e.g., for a total of 10 ms for a hundred test cases).

In addition, if a set of tests exceeds the L2 size, then the test engine 102 may have to do multiple pattern loads and/or multiple executions to run all the tests. Performing multiple pattern loading stages and/or execution stages, however, is undesirable for manufacturing facilities. For example, the total time for all the test pattern runs should be a few seconds in order for manufacturing facilities to remain efficient, productive, etc. This time, in general, has to include time for power on reset (POR), initialization, setup, pattern loading, execution and status read out.

Aspects presented herein provide techniques for reducing the time associated with executing a test pattern. For example, the load store unit 222 includes a pipeline bypass component 224, which is configured to perform the techniques presented herein. In one embodiment, once the processor 122 receives a test case(s), the load store unit 222 can use the bypass component 224 to bypass the processor pipeline in order to perform save and restore operations for registers in the register file 220. In one embodiment, the pipeline bypass component 224 allows the load store unit 222 to eliminate fetch, decode, and dispatch operations that typically have to be performed before the load store unit is able to perform register operations in order to execute an instruction.

Figure 3:
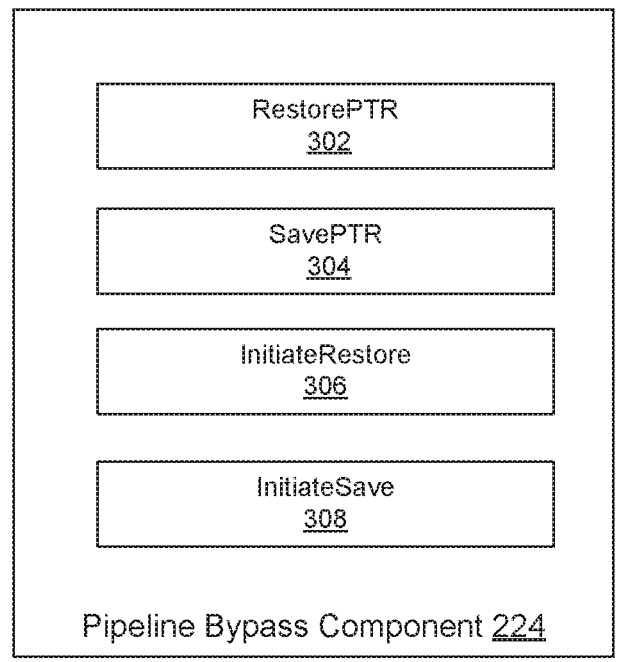
FIG. 3 illustrates a block diagram of the processor pipeline bypass component, according to one embodiment.

FIG. 3 further illustrates an example of the pipeline bypass component 224, described above relative to FIG. 2, according to one embodiment. As shown, the pipeline bypass component 224 includes a register for RestorePTR 302, a register for SavePTR 304, a register for InitiateRestore 306, and a register for InitiateSave 308.

In one embodiment, the pipeline bypass component 224 uses RestorePTR 302 to load register values from the L2 cache into the register file 220. For example, the processor 122 and/or the test engine 102 may load a pointer in RestorePTR 302 where the pointer address points to the register values for the test case that the LSU 222 loads into the register file 220, e.g., from L2 cache. In one embodiment, the pipeline bypass component 224 uses SavePTR 304 to save results of the test case (within the register file 220) back into L2 cache or main memory. For example, the processor 122 and/or the test engine 102 may load a pointer in SavePTR 304 where the pointer address points to where the resulting register values will be saved to, e.g., in L2 cache.

In one embodiment, the LSU 222 uses InitiateRestore 306 to start a load operation to register(s) in the register file 220. For example, the processor 122 can trigger the LSU 222 to start the load by writing to the InitiateRestore register 306. Once triggered, the LSU 222 uses the pointer in RestorePTR 302 to load the register values (for the instructions associated with the test case) from L2 cache into the register file 220. Once loaded, the LSU 222 then performs the load and/or store operations associated with the particular test case. For example, the LSU 222 may perform memory transfers to and/or from the registers in the register file 222 based on the instructions for the test case. Once completed, the LSU 222 uses InitiateSave register 308 to initiate save of the results of the memory locations in the register file 220 to L2 cache. For example, the processor 122 can trigger the LSU 222 to start the save operation by writing to InitiateSave 308. Once triggered, the LSU 222 uses the pointer in SavePTR 304 to save the resulting register values in the register file 220 into L2 cache or main memory.

Figure 4:
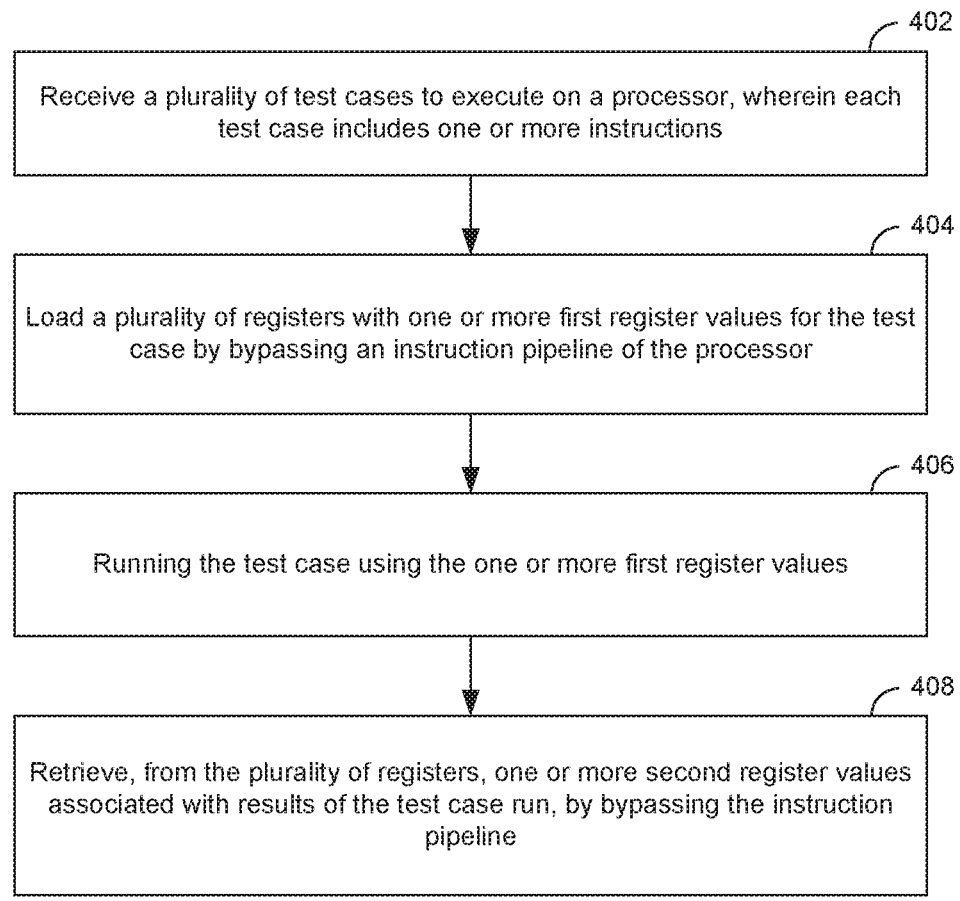
FIG. 4 illustrates a method for bypassing the processor pipeline for executing instructions for a test case, according to one embodiment.

FIG. 4 illustrates a method 400 for executing a test case on processor, while bypassing the processor pipeline, according to one embodiment. As shown, the method 400 begins at step 402, where the processor 122 receives a plurality of test cases to execute on the processor. For example, each test case may include one or more instructions (e.g., such as load/store instructions). At step 404, the processor 122 loads a plurality of registers with one or more first register values for the test case by bypassing the instruction pipeline of the processor. For example, as mentioned above, the processor 122 can use the registers in the pipeline bypass component 224 of the LSU 222 to bypass the instruction fetch stage, the instruction decode stage, and the instruction dispatch stage associated with the instruction pipeline of the processor. At step 406, the processor 122 runs the test case using the one or more first register values. For example, to run the test case, the processor 122 may access the registers in the register file 220 to transfer register values to and/from the registers in the register file 220, based on the one or more instructions. Running the test case may also include writing resulting data into the registers of the register file 220 based on the instructions. At step 408, the processor 122 retrieves, from the plurality of registers, one or more second register values associated with results of the test case run, by bypassing the instruction pipeline.

Figure 5:
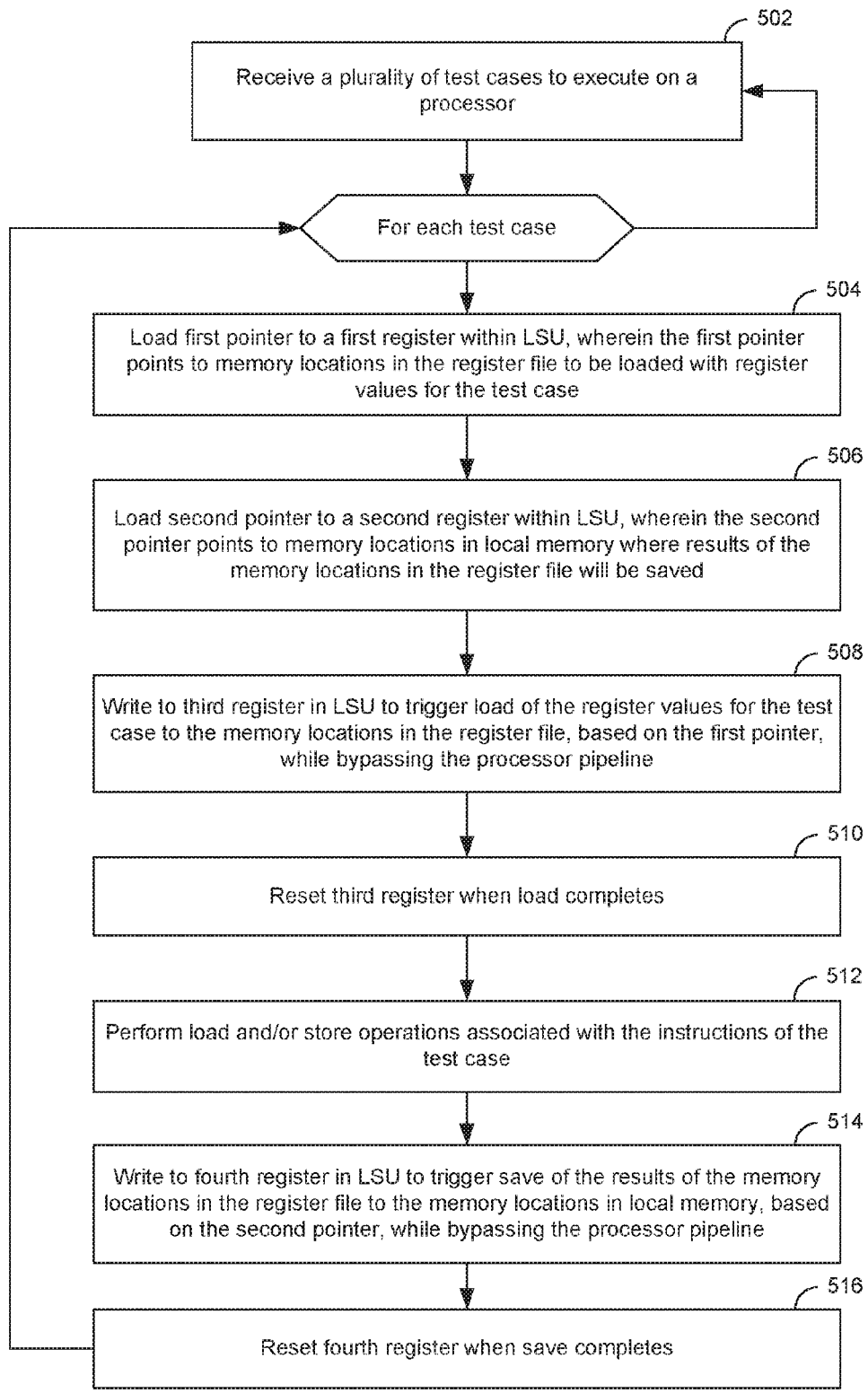
FIG. 5 illustrates a method for bypassing the processor pipeline for executing instructions for a test case, according to one embodiment.

FIG. 5 illustrates a method 500 for executing a test case on processor, while bypassing the processor pipeline, according to one embodiment. As shown, the method 500 begins at step 502, where the processor 122 receives a plurality of test cases (e.g., from test engine 102) to execute on the processor. As mentioned above, each test case may include one or more instructions (e.g., such as load and store instructions). At step 504, the processor 122 loads a first pointer to a first register (e.g., RestorePTR 302) within the LSU 222. The first pointer points to memory locations in the register file 220 where the register values associated with a test case will be loaded. At step 506, the processor 122 loads a second pointer to a second register (e.g., SavePTR 304) within the LSU 222. The second pointer points to memory locations in local memory (e.g., L1 cache, L2 cache, L3 cache, main memory, etc.) where results of the memory locations in the register file 220 will be saved.

At step 508, the processor 122 writes to a third register (e.g., InitiateRestore 306) in LSU 222 to trigger a load of the register values for the test case to the memory locations in the register file 220, based on the first pointer, while bypassing the processor pipeline. At step 510, the processor 122 resets the third register when the load completes. At step 512, the processor 122 executes the test case (i.e., performs the load and/or store operations associated with instructions of the test case). At step 514, the processor 122 writes to a fourth register (e.g., InitiateSave 308) in LSU 222 to trigger a save of the results of the memory locations in the register file 220 to the memory locations in local memory, based on the second pointer, while bypassing the processor pipeline. At 516, the processor 122 resets the fourth register when the save completes.

Note that, in some embodiments, the test engine 102 may load the first pointer and/or the second pointer to the first and second registers, respectively. Further, in some embodiments, the third and fourth registers within LSU 222 may be the same register. Stated differently, the pipeline bypass component 224 may include three registers, one for RestorePTR 302, one for SavePTR 304 and one for InitiateRestore/InitiateSave (e.g., as opposed to four registers).

Doing so in this manner allows the processor 122 to substantially reduce (and/or eliminate) the number of instructions associated with executing a test case. As such, the techniques presented herein can be used to reduce the size of the testing program, which may allow for more tests to be loaded in one time, and reduce the time associated with determining SPQL for critical paths of a processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

While the foregoing is directed to embodiments of the present disclosure, other and further embodiments of the invention may be devised without departing from the basic scope thereof, and the scope thereof is determined by the claims that follow.

What is claimed is:

1. A method for executing a test case to test a processor by bypassing an instruction pipeline of the processor, the method comprising:
   receiving a plurality of test cases to execute on the processor, wherein each test case comprises one or more instructions;
   loading a plurality of registers with one or more first register values for the test case by bypassing the instruction pipeline, wherein loading the plurality of registers comprises loading a first pointer to a first register within a load store unit (LSU) of the processor, wherein the first pointer points to memory locations in the plurality of registers where the one or more first register values for the test case will be loaded;
   running the test case using the one or more first register values; and
   retrieving, from the plurality of registers, one or more second register values associated with results of the test case run, by bypassing the instruction pipeline.

2. The method of claim 1, further comprising:
   loading a second pointer to a second register within the LSU of the processor, wherein the second pointer points to memory locations in L2 cache where the one or more second register values will be saved.

3. The method of claim 2, wherein loading the plurality of registers with the one or more first register values for the test case is triggered by writing to a third register within the LSU of the processor, and wherein the one or more first register values are loaded to the memory locations in the plurality of registers based on the first pointer.

4. The method of claim 3, wherein retrieving, from the plurality of registers, the one or more second register values for the test case is triggered by writing to a fourth register within the LSU of the processor, and wherein the one or more second register values are saved to the memory locations in the L2 cache, based on the second pointer.

5. The method of claim 1, wherein the plurality of registers comprise at least one of general purpose registers (GPRs) or vector registers.

6. The method of claim 1, wherein the instruction pipeline of the processor comprises an instruction fetch stage, an instruction decode stage, and an instruction dispatch stage.

7. A system, comprising:
   a processor comprising:
      a plurality of registers;
      an instruction pipeline comprising an instruction fetch unit, an instruction decode unit and an instruction dispatch unit; and
      a load store unit (LSU); and
   a memory storing program code, which, when executed on the processor, performs an operation comprising:

receiving a plurality of test cases to execute on the processor, wherein each test case comprises one or more instructions;

loading the plurality of registers with one or more first register values for the test case by bypassing the instruction pipeline, wherein loading the plurality of registers comprises loading a first pointer to a first register within the LSU, and wherein the first pointer points to memory locations in the plurality of registers where the one or more first register values for test case will be loaded;

running the test case using the one or more first register values; and retrieving, from the plurality of registers, one or more second register values associated with results of the test case run, by bypassing the instruction pipeline.

8. The system of claim 7, wherein the operation further comprises:

loading a second pointer to a second register within the LSU, wherein the second pointer points to memory locations in L2 cache where the one or more second register values will be saved.

9. The system of claim 8, wherein loading the plurality of registers with the one or more first register values for the test case is triggered by writing to a third register within the LSU, and wherein the one or more first register values are loaded to the memory locations in the plurality of registers based on the first pointer.

10. The system of claim 9, wherein retrieving, from the plurality of registers, the one or more second register values for the test case is triggered by writing to a fourth register within the LSU, and wherein the one or more second register values are saved to the memory locations in the L2 cache, based on the second pointer.

11. The system of claim 7, wherein the plurality of registers comprise at least one of general purpose registers (GPRs) or vector registers.

12. A computer program product, comprising:

a non-transitory computer-readable storage medium having computer-readable program code embodied therewith, the computer-readable program code executable by one or more computer processors to perform an operation for executing a test case to test a processor by bypassing an instruction pipeline of the processor, the operation comprising:

receiving a plurality of test cases to execute on the processor, wherein each test case comprises one or more instructions;

loading a plurality of registers with one or more first register values for the test case by bypassing the instruction pipeline, wherein loading the plurality of registers comprises loading a first pointer to a first register within a load store unit (LSU) of the processor, wherein the first pointer points to memory locations in the plurality of registers where the one or more first register values for the test case will be loaded;

running the test case using the one or more first register values; and retrieving, from the plurality of registers, one or more second register values associated with results of the test case run, by bypassing the instruction pipeline.

13. The computer program product of claim 12, wherein the operation further comprises:

loading a second pointer to a second register within the LSU of the processor, wherein the second pointer points to memory locations in L2 cache where the one or more second register values will be saved.

14. The computer program product of claim 13, wherein loading the plurality of registers with the one or more first register values for the test case is triggered by writing to a third register within the LSU of the processor, and wherein the one or more first register values are loaded to the memory locations in the plurality of registers based on the first pointer.

15. The computer program product of claim 14, wherein retrieving, from the plurality of registers, the one or more second register values for the test case is triggered by writing to a fourth register within the LSU of the processor, and wherein the one or more second register values are saved to the memory locations in the L2 cache, based on the second pointer.

16. The computer program product of claim 12, wherein the plurality of registers comprise at least one of general purpose registers (GPRs) or vector registers.

17. The computer program product of claim 12, wherein the instruction pipeline of the processor comprises an instruction fetch stage, an instruction decode stage, and an instruction dispatch stage.

* * * * *